United States Patent
Majid et al.

[11] Patent Number: 5,986,897
[45] Date of Patent: Nov. 16, 1999

[54] SWITCHED-MODE POWER SUPPLY HAVING A CIRCUIT ARRANGEMENT FOR TURNING THE SWITCHING DEVICE WHEN A VOLTAGE ON THE SWITCHING DEVICE IS AT A MINIMUM

[75] Inventors: Navid Majid, Mohegan Lake, N.Y.; Pawel M. Gradzki, Potomac, Md.

[73] Assignee: Philips Electronics North America Corporation, New York, N.Y.

[21] Appl. No.: 09/107,188

[22] Filed: Jun. 29, 1998

[51] Int. Cl.[6] .................................................. H02M 3/335
[52] U.S. Cl. .................................................. 363/21; 363/97
[58] Field of Search .................................. 363/21, 95, 97, 363/131

[56] References Cited

U.S. PATENT DOCUMENTS

| | | | |
|---|---|---|---|
| 4,975,823 | 12/1990 | Rilly et al. | 363/97 |
| 5,032,976 | 7/1991 | Marinus et al. | 363/21 |
| 5,041,956 | 8/1991 | Marinus | 363/21 |
| 5,075,837 | 12/1991 | Feldtkeller | 363/19 |
| 5,291,386 | 3/1994 | Wu | 363/21 |
| 5,349,516 | 9/1994 | Megeid | 363/97 |
| 5,497,311 | 3/1996 | Hanawaka | 363/21 |
| 5,689,407 | 11/1997 | Marinus et al. | 363/97 |
| 5,748,461 | 5/1998 | Preller | 363/21 |
| 5,812,383 | 9/1998 | Majid et al. | 363/21 |
| 5,825,638 | 10/1998 | Shutts | 363/21 |
| 5,841,641 | 11/1998 | Faulk | 363/21 |
| 5,852,550 | 12/1998 | Majid et al. | 363/21 |
| 5,892,672 | 4/1999 | Preller | 363/97 |

*Primary Examiner*—Jeffrey Sterrett
*Attorney, Agent, or Firm*—Edward W. Goodman

[57] ABSTRACT

A circuit arrangement for use in a controller circuit of a switched mode power supply for turning on a power device in the switched-mode power supply when a voltage across the power device is at a minimum. The circuit arrangement includes circuitry for detecting when a change in the voltage across the power device is substantially zero, and for detecting when the voltage across the power device is less than a predetermined level. When these two criteria are met, the circuit arrangement generates a turn-on signal for the power device.

10 Claims, 5 Drawing Sheets

SWITCHED-MODE POWER SUPPLY HAVING A CIRCUIT ARRANGEMENT FOR TURNING THE SWITCHING DEVICE WHEN A VOLTAGE ON THE SWITCHING DEVICE IS AT A MINIMUM

BACKGROUND OF THE INVENTION

1. Field of the Invention

The subject invention relates to switched-mode power supplies.

2. Description of the Related Art

Switched-mode power supplies generally include a power device for periodically applying power to a primary winding of a transformer. To this end, a main current path of the power device is connected in series with the primary winding and a source of power. In order to minimize dissipation on the power device, it is desirable that the power device be turned on when the voltage on the drain of the power device is at its minimum. This usually requires the measurement of the drain voltage, where voltages as high as 650 V. may be present, depending upon the application. Measuring such a high voltage is usually difficult and requires costly components.

SUMMARY OF THE INVENTION

An object of the subject invention to provide a circuit arrangement for easily detecting the voltage on the power device without the use of costly components.

This object is achieved in a circuit arrangement for sensing a voltage on a drain of a power device for turning on the power device when said voltage has a minimum value, the drain of said power device being coupled in series with a power source and a primary winding of a transformer, said transformer having an auxiliary winding for providing information concerning a voltage in said primary winding, wherein said circuit arrangement comprises detecting means coupled to said auxiliary winding for detecting an auxiliary voltage on said auxiliary winding; first determining means for determining whether a change in said auxiliary voltage has a substantially zero value; second determining means for determining whether said auxiliary voltage exceeds a predetermined value; and means for generating a turn-on signal for said power device in cooperation with said first and second determining means.

A further object of the invention is to provide a switched-mode power supply having a controller circuit incorporating the above circuit arrangement.

This object is achieved in a switched-mode power supply comprising a transformer having a primary winding, a secondary winding, and an auxiliary winding, the secondary winding being coupled to a smoothing capacitor via a rectifier element to supply a DC output voltage; a switching device having a main current path arranged in series with the primary winding of the transformer; and a controller circuit having an output for supplying a drive signal to a control input of the switching device for periodically switching the switching device on and off, and an input coupled to the auxiliary winding of the transformer for receiving information indicative of the DC output voltage, said controller circuit controlling the on and/or off periods of the switching device in order to obtain a desired value of the information from the auxiliary winding in a steady state situation, said controller circuit having a circuit arrangement for sensing a voltage on a terminal of the switching device in the main current path for causing the switching device to turn on when said voltage has a minimum value, wherein said circuit arrangement comprises detecting means coupled to said auxiliary winding for detecting an auxiliary voltage on said auxiliary winding; first determining means for determining whether a change in said auxiliary voltage has a substantially zero value; second determining means for determining whether said auxiliary voltage exceeds a predetermined value; and means for generating a turn-on signal for said switching device in cooperation with said first and second determining means.

The subject invention is based on the principle that $i_C = C(dv/dt)$, where C is a capacitor, $i_C$ is the current through the capacitor, and $(dv/dt)$ is the change in the voltage across the capacitor over time, and when $(dv/dt)=0$, $i_C=0$. The condition where $(dv/dt)=0$ corresponds to the point where the $(dv/dt)$ of the drain voltage of the power device is zero, which happens either at the minimum or the maximum voltage on the drain. The value of the capacitor current $i_C$ can be measured by putting a resistor R in series with the capacitor C, and measuring the voltage across the resistor R. This principle is shown in FIG. 1 wherein a comparator 1 is connected across the resistor R and supplies a measure of $(dv/dt)$. FIGS. 2A–2C show various waveforms of the circuit of FIG. 1.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
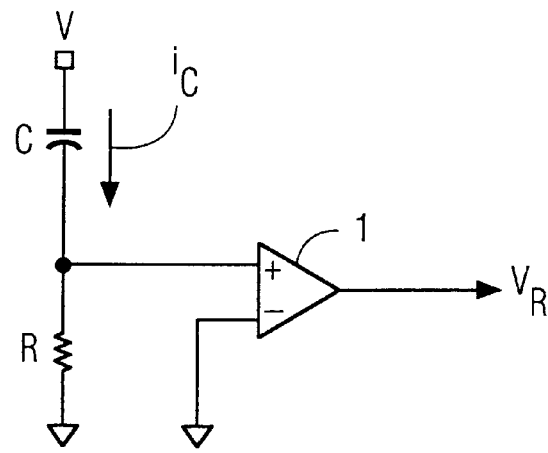
FIG. 1 is a schematic diagram showing the principle of the invention.
Figure 2A:
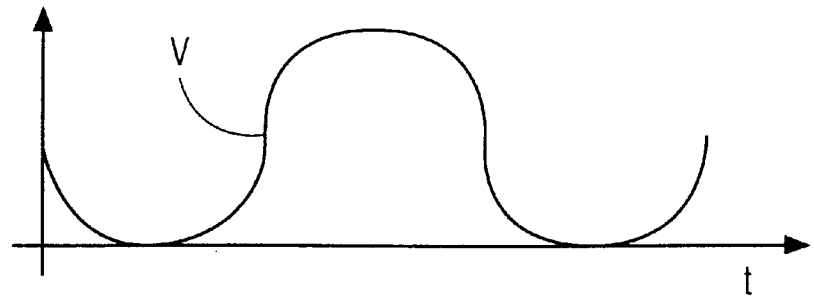
FIGS. 2A–2C show waveforms in the schematic diagram of FIG. 1.
Figure 2B:
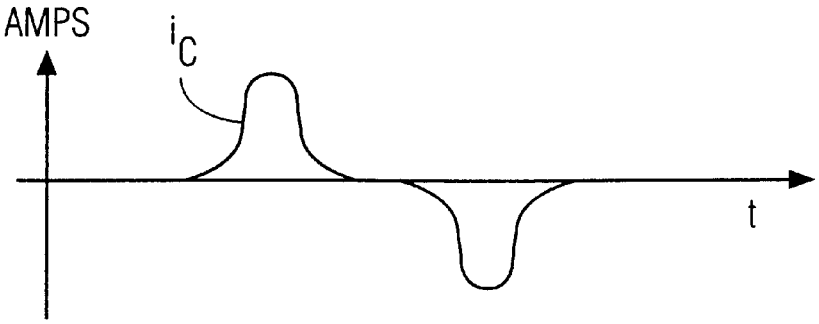
Figure 2C:
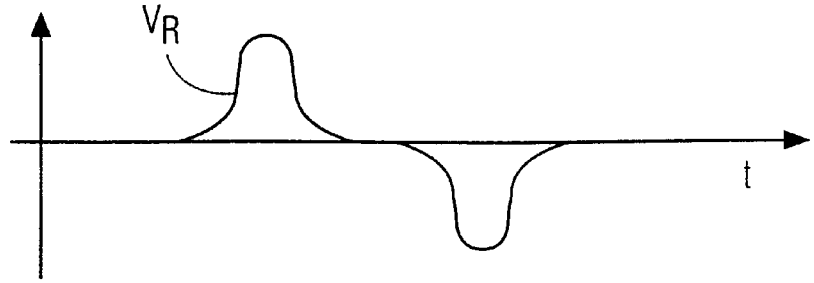
Figure 3:
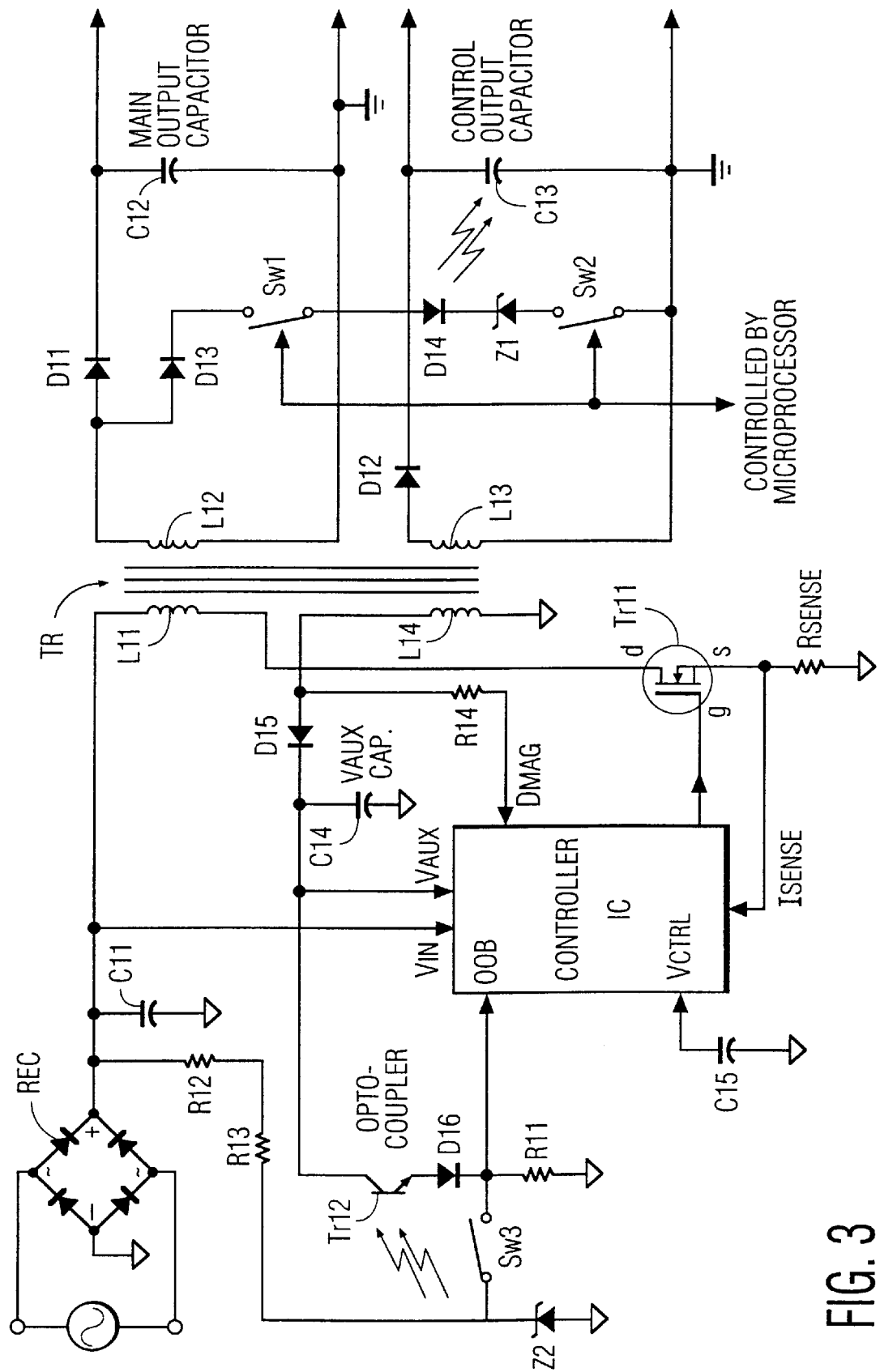
FIG. 3 shows a schematic diagram of a switched-mode power supply.

FIG. 3 shows a schematic diagram of a known switched-mode power supply. In particular, a diode rectifier bridge REC is connected to a line voltage source. An output from the rectifier bridge REC is connected to ground through a capacitor C11 and to one end of a primary winding L11 of a transformer TR. The other end of primary winding L11 is connected to one terminal of a switching device Tr11, the other terminal of which being connected to ground through a sense resistor $R_{SENSE}$. A first secondary winding L12 of the transformer TR has a first end and a second end connected to each other through a series arrangement of a diode D11 and a main output capacitor C12, the second end of the first secondary winding L12 also being connected to ground. A load (not shown) may be connected across the main output capacitor C12.

The transformer TR also includes a second secondary winding L13 having a first end and a second end connected to each other through a series arrangement of a diode D12 and a control output capacitor C13, the second end of the second secondary winding L13 also being connected to ground. A microprocessor (not shown), for controlling, for example, a television receiver in which the switched-mode power supply circuit is installed, is connected across the control output capacitor C13 to receive operating power.

The first end of the first primary winding L12 is also connected via a diode D13 and a controllable switch Sw1 to one end of the control output capacitor C13, while the control output capacitor C13 is shunted by a series arrangement of a light emitting diode D14 of an opto-coupler, a Zener diode Z1 and a controllable switch Sw2. The controllable switches Sw1 and Sw2 are controlled by a signal from the microprocessor to initiate the stand-by mode of the switched-mode power supply circuit.

The transformer TR further includes an auxiliary primary winding L14 which has one end connected to a diode D15, and then to ground through a $V_{AUX}$ capacitor C14, to a $V_{AUX}$ input of a controller IC, and to one terminal of a light sensor Tr12 of the opto-coupler, the other terminal of the light sensor Tr12 being connected to ground via resistor R11, and to a stand-by mode detecting input (OOB) of the controller IC. In addition, a series arrangement of two resistors, R12 and R13, and a Zener diode Z2 connect the output of the rectifier bridge REC to ground. The junction between resistor R13 and Zener diode Z2 is connected to the OOB input via a power switch Sw3. The other end of the auxiliary primary winding L14 is connected to ground. The controller IC also has a $V_{IN}$ input connected to the output of the rectifier bridge REC, a $D_{MAG}$ input connected through a resistor R14 to the one end of the auxiliary primary winding L14, a driver output connected to the control input of switching device Tr11, an $I_{SENSE}$ input connected to the resistor $R_{SENSE}$, and a $V_{CTRL}$ terminal connected to ground by a discharge capacitor C15.

Figure 4:
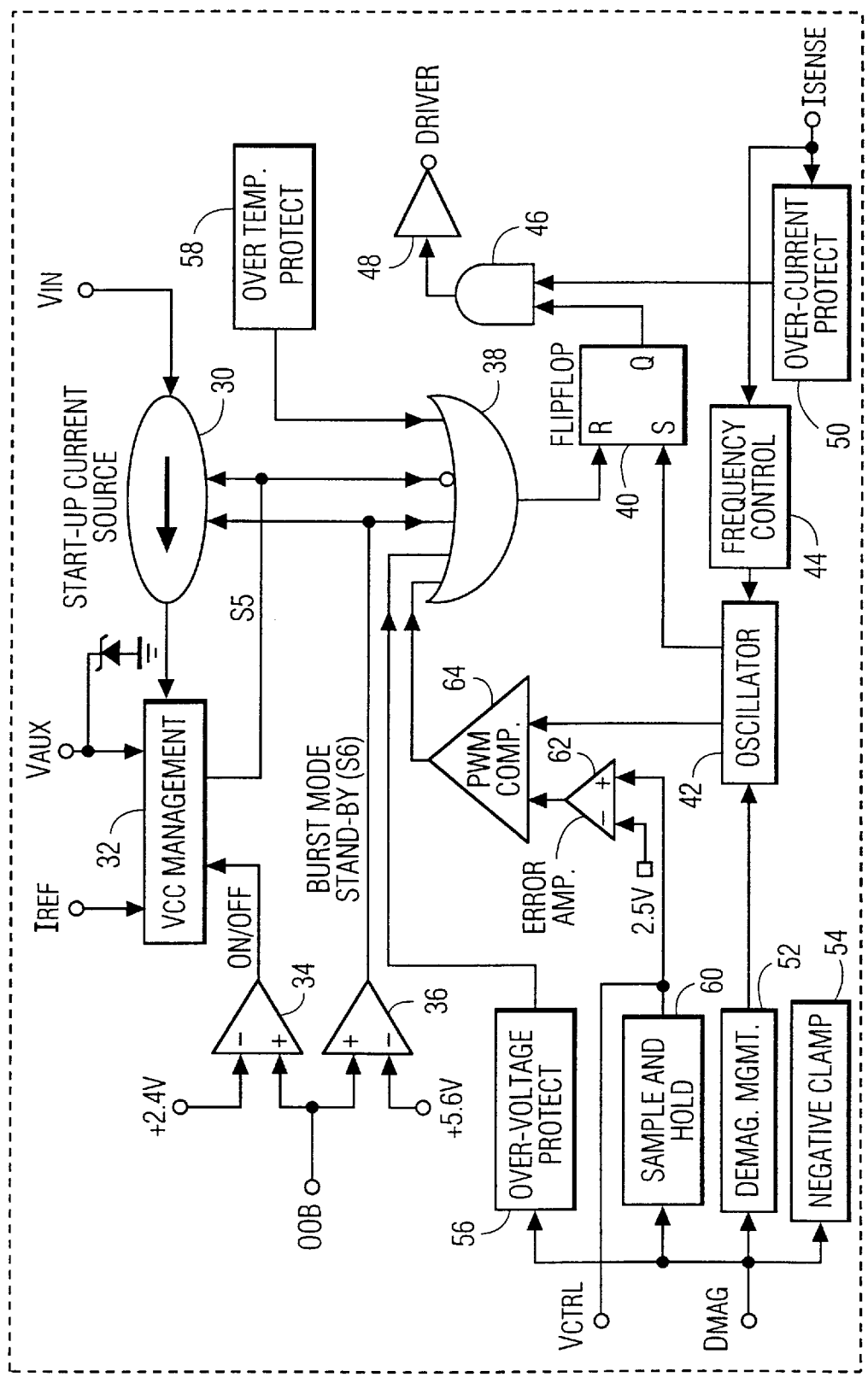
FIG. 4 shows a block diagram of a controller circuit used in the switched-mode power supply of FIG. 3.

FIG. 4 shows a block diagram of a known controller IC. The controller IC includes a start-up current source 30 coupled to the $V_{IN}$ input and a Vcc management circuit 32 connected to the $V_{AUX}$ and $I_{REF}$ inputs. The OOB input is connected to a first comparator 34 for comparing the voltage thereon to +2.4 V, and generates an "OFF/ON" signal. This OFF/ON signal is applied to an input of the Vcc management circuit 32. The OOB input is also connected to a second comparator 36 for comparing the voltage thereon to +5.6 V, for generating a "Burst Mode Stand-by" signal S6. This signal S6 is applied to the start-up current source 30 and to a first input of an OR-gate 38. An output (S5) from the Vcc management circuit 32 is also applied to the start-up current source 30 and to an inverting second input of OR-gate 38. An output from OR-gate 38 is applied to the reset input of an RS flip-flop 40, the set input being connected to an output of an oscillator 42 which is connected to the output of a frequency control circuit 44 having an input connected to the $I_{SENSE}$ input. The Q output from the RS flip-flop 40 is connected to one input of an AND-gate 46 which has an output connected to a driver 48 for driving the switching device Tr11. The other input of the AND-gate 46 is connected to the output of an over-current protection circuit 50 which monitors the current through the VDMOS via the $I_{SENSE}$ input. The $D_{MAG}$ input is connected to a demagnetization management circuit 52 and a negative clamp 54 for protection against saturation of the inductor in the power supply. The presence of demagnetization protection guarantees discontinuous conduction mode operation which simplifies the design of feedback control and gives faster transient response for the system. An output from the demagnetization management circuit 52 is connected to the oscillator 42. In addition, the $D_{MAG}$ input is connected to an over-voltage protection circuit 56 having an output connected to a third input of the OR-gate 38, which also has a fourth input connected to the output of an over-temperature protection circuit 58.

The $D_{MAG}$ input is also connected to a sample-and-hold circuit 60 the output of which is connected to the $V_{CTRL}$ terminal of the controller IC and to one input of an error amplifier 62 which receives a 2.5 V. reference voltage at another input. The output from the error amplifier 62 is connected to one input of a pulse width modulation (PWM) comparator 64 which receives an output from the oscillator 42 at a second input. The output from the PWM comparator 64 is connected to a fifth input of the OR-gate 38. The error amplifier 62 and the PWM comparator 64 form a PWM circuit which compares the voltage on the discharge capacitor C15, which is supposed to be a sampled representation of the output voltage, to the oscillator waveform to determine the duty cycle of the switching device.

Figure 5:
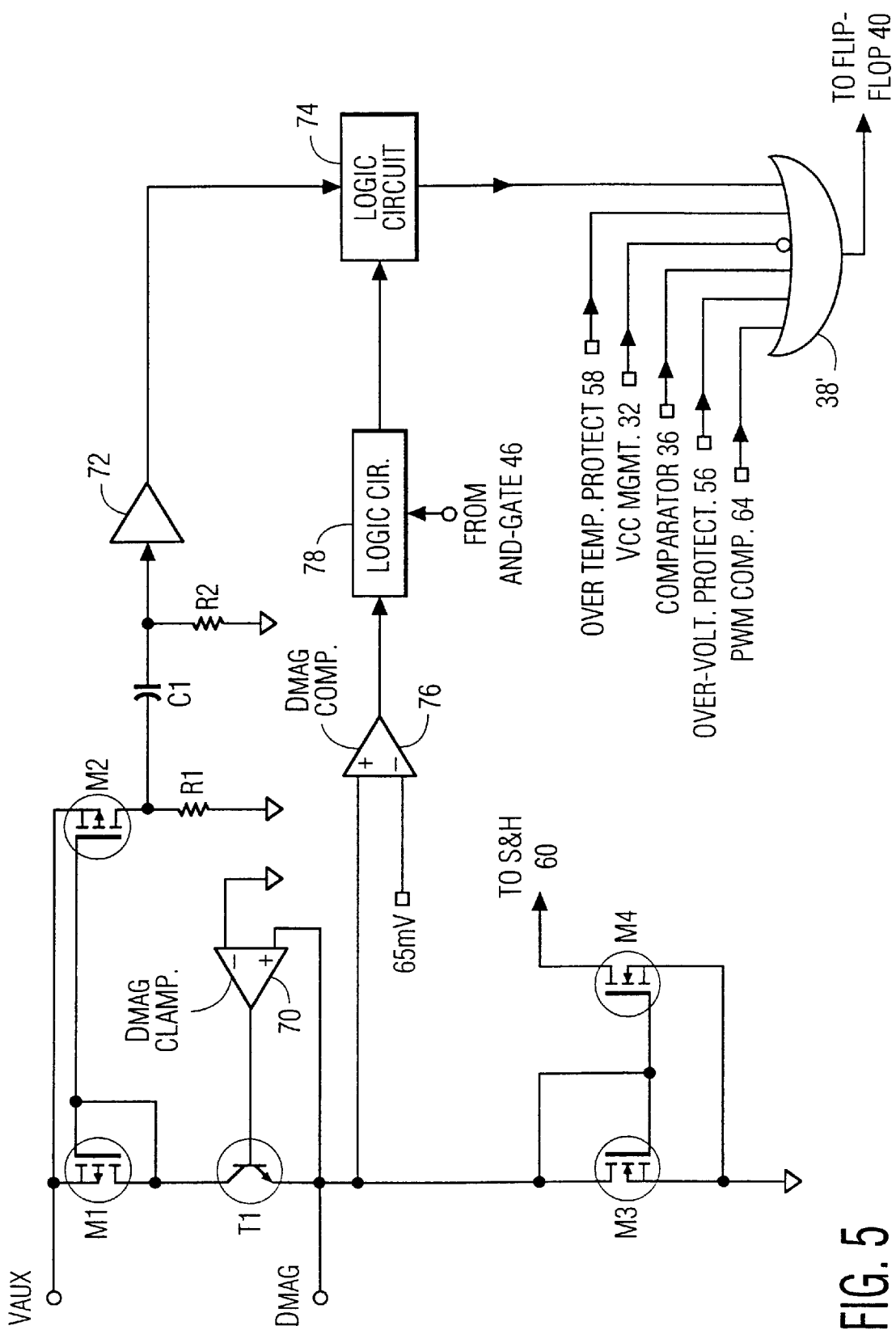
FIG. 5 show an embodiment of the circuit arrangement of the subject invention for incorporation in the controller circuit of FIG. 4.

FIG. 5 shows a circuit diagram of the circuit arrangement of the subject invention. The $V_{AUX}$ input of the controller IC is connected to a current mirror formed by P-MOSFET's M1 and M2. The source of P-MOSFET M1 is connected to the collector of NPN transistor T1 having an emitter connected to the $D_{MAG}$ input of the controller IC. A $D_{MAG}$ clamp 70 has a non-inverting input connected to the $D_{MAG}$ input and an inverting input connected to ground. The output from the $D_{MAG}$ clamp 70 is connected to the base of transistor T1. The $D_{MAG}$ clamp 70 and the transistor T1 form part of the negative clamp 54 shown in FIG. 4.

The source of P-MOSFET M2 is connected to ground through a resistor R1 and, through a capacitor C1, to an input of an amplifier 72, the input of the amplifier 72 being connected to ground via a resistor R2. The output from amplifier 72 is connected to a first input of a logic circuit 74.

The $D_{MAG}$ input is also connected to a non-inverting input of a $D_{MAG}$ comparator 76 which has an inverting input connected to receive 65 mV. The $D_{MAG}$ comparator 76 forms a part of the $D_{MAG}$ management circuit 52 shown in FIG. 4. An output from the $D_{MAG}$ comparator 76 is connected to a logic circuit 78 having a reset input connected to the output of AND-gate 46 shown in FIG. 4. An output from the logic circuit 78 is connected to a second input of the logic circuit 74. An output from logic circuit 74 is connected to an input of OR-gate 38' which replaces the OR-gate 38 shown in FIG. 4. For completeness, FIG. 5 shows a current mirror formed by two N-MOSFET's M3 and M4 connecting the $D_{MAG}$ input to the sample-and-hold circuit 60 shown in FIG. 4.

Figure 6A:
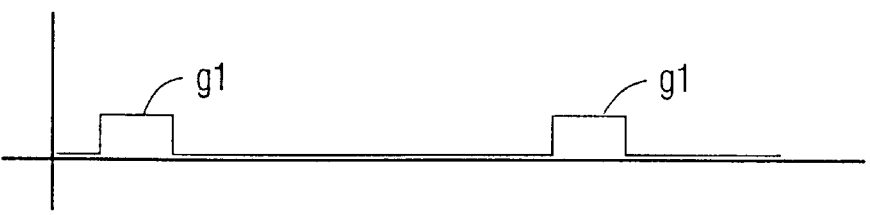
FIGS. 6A–6G show waveforms describing the operation of the circuit arrangement.
Figure 6B:
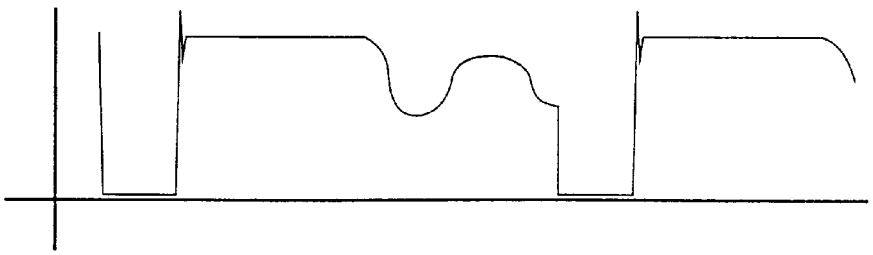
Figure 6C:
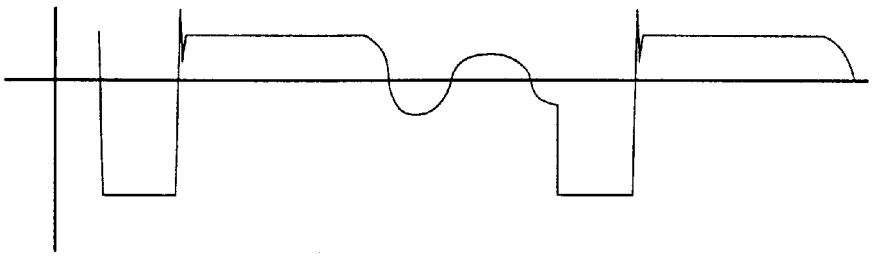
Figure 6D:
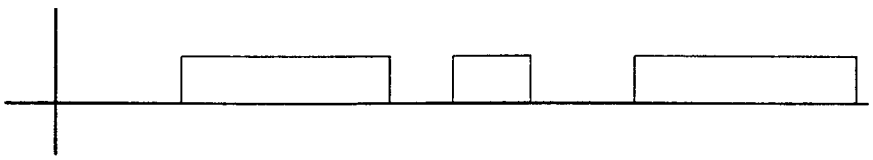
Figure 6E:
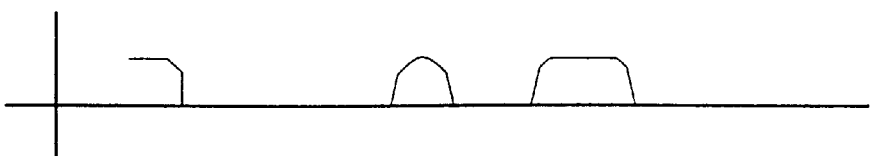
Figure 6F:
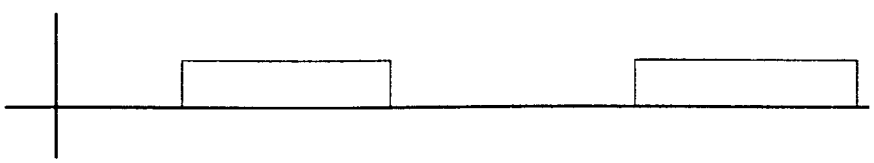
Figure 6G:

FIGS. 6A–6G show various waveforms which would explain the operation of the circuit arrangement of the subject invention. In particular, FIG. 6A shows the gate pulses g1 and g2 from the AND-gate 46 which cause the switching device Tr11 to turn on. FIG. 6B shows the voltage across the switching device Tr11, while FIG. 6C shows the auxiliary voltage generated by the auxiliary winding L14. FIG. 6D shows the output from the $D_{MAG}$ comparator 76 which is a measure of when the voltage at the $D_{MAG}$ input, which is connected to the auxiliary winding by resistor R14, rises above 65 mV. FIG. 6E shows the current generated by the $D_{MAG}$ clamp 70 which generate a current whenever the voltage on the $D_{MAG}$ input attempts to go negative. The reset input of logic circuit 78 receives the output from the AND-gate 46 and after the gate pulse ends, the output from the logic circuit 78 (see FIG. 6F) follows the output of the $D_{MAG}$ comparator 76 for one cycle until it is reset by the next gate pulse. The logic circuit 74 then generates the turn-on signal (see FIG. 6G) in response to the outputs from amplifier 72 and logic circuit 74.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A circuit arrangement for sensing a voltage on a drain of a power device for turning on the power device when said voltage has a minimum value, the drain of said power device being coupled in series with a power source and a primary winding of a transformer, said transformer having an auxiliary winding for providing information concerning a voltage in said primary winding, wherein said circuit arrangement comprises:

detecting means coupled to said auxiliary winding for detecting an auxiliary voltage on said auxiliary winding;

first determining means for determining whether a change in said auxiliary voltage has a substantially zero value;

second determining means for determining whether said auxiliary voltage exceeds a predetermined value; and means for generating a turn-on signal for said power device in cooperation with said first and second determining means.

2. A circuit arrangement as claimed in claim 1, wherein said second determining means comprises a comparator circuit for comparing said auxiliary voltage to said predetermined value, said comparator circuit generating an output signal when said auxiliary voltage exceeds said predetermined value.

3. A circuit arrangement as claimed in claim 1, wherein said first determining means comprises a clamp circuit coupled to receive said auxiliary voltage for generating a current when said auxiliary voltage drops below zero; and logic means coupled to an output of said clamp circuit for generating an output signal when said current generated by said clamp circuit is at a maximum level indicating that the change in said auxiliary voltage has said substantially zero value.

4. A circuit arrangement as claimed in claim 1, wherein said generating means comprises a logic circuit for generating the turn-on signal when said first determining means is generating an output signal and said second determining means is not generating an output signal.

5. A circuit arrangement as claimed in claim 1, wherein said circuit arrangement further comprises means for detecting when said power device is turned on, and means for inhibiting said generating means when said power device is turned on.

6. A switched-mode power supply comprising:

a transformer having a primary winding, a secondary winding, and an auxiliary winding, the secondary winding being coupled to a smoothing capacitor via a rectifier element to supply a DC output voltage;

a switching device having a main current path arranged in series with the primary winding of the transformer; and a controller circuit having an output for supplying a drive signal to a control input of the switching device for periodically switching the switching device on and off, and an input coupled to the auxiliary winding of the transformer for receiving information indicative of the DC output voltage, said controller circuit controlling the on and/or off periods of the switching device in order to obtain a desired value of the information from the auxiliary winding in a steady state situation, said controller circuit having a circuit arrangement for sensing a voltage on a terminal of the switching device in the main current path for causing the switching device to turn on when said voltage has a minimum value, wherein said circuit arrangement comprises:

detecting means coupled to said auxiliary winding for detecting an auxiliary voltage on said auxiliary winding;

first determining means for determining whether a change in said auxiliary voltage has a substantially zero value;

second determining means for determining whether said auxiliary voltage exceeds a predetermined value; and means for generating a turn-on signal for said switching device in cooperation with said first and second determining means.

7. A switched-mode power supply as claimed in claim 6, wherein said second determining means comprises a comparator circuit for comparing said auxiliary voltage to said predetermined value, said comparator circuit generating an output signal when said auxiliary voltage exceeds said predetermined value.

8. A switched-mode power supply as claimed in claim 6, wherein said first determining means comprises a clamp circuit coupled to receive said auxiliary voltage for generating a current when said auxiliary voltage drops zero; and logic means coupled to an output of said clamp circuit for generating an output signal when said current generated by said clamp circuit is at a maximum level indicating that the change in said auxiliary voltage has said substantially zero value.

9. A switched-mode power supply as claimed in claim 6, wherein said generating means comprises a logic circuit for generating the turn-on signal when said first determining means is generating an output signal and said second determining means is not generating an output signal.

10. A switched-mode power supply as claimed in claim 6, wherein said circuit arrangement further comprises means for detecting when said switching device is turned on; and means for inhibiting said generating means when said switching device is turned on.

* * * * *